United States Patent [19]
Stewart

[11] Patent Number: 6,104,722

[45] Date of Patent: *Aug. 15, 2000

[54] APPARATUS FOR AND METHOD OF COMMUNICATING AMONG DEVICES INTERCONNECTED ON A BUS

[75] Inventor: Brett B. Stewart, Austin, Tex.

[73] Assignee: Advanced Micro Devices Inc., Sunnyvale, Calif.

[ * ] Notice: This patent is subject to a terminal disclaimer.

[21] Appl. No.: 08/916,031

[22] Filed: Aug. 21, 1997

Related U.S. Application Data

[60] Provisional application No. 60/038,951, Mar. 7, 1997.

[51] Int. Cl.[7] ............................... H04L 12/40; H04J 3/02
[52] U.S. Cl. ........................................... 370/438; 370/462
[58] Field of Search ..................................... 370/431, 432, 370/438, 445, 439, 447, 466, 467, 522, 461, 462, 480, 436, 437; 375/222

[56] References Cited

U.S. PATENT DOCUMENTS

4,534,024  8/1985  Maxemchuk ............................ 370/445
4,953,210  8/1990  McGlynn etal. ......................... 375/222
5,936,960  8/1999  Stewart ................................... 370/438

*Primary Examiner*—Chau Nguyen
*Assistant Examiner*—Phuongchau Ba Nguyen
*Attorney, Agent, or Firm*—Foley & Lardner

[57] ABSTRACT

An information communication system has a plurality of nodes connected by both an information transmission bus and a signalling channel. The information transmission bus is used to carry messages between devices attached to the nodes of the network. The signalling channel is used to signal nodes that a message transmission is about to occur. Based on the devices connected to the nodes, the appropriate communication protocol can be set up and resources allocated on the information transmission bus to efficiently transfer information. The invention allows a device acting as a message source to communicate with another device at a first node using a first protocol and to communicate with a different device at a second node using a second protocol. The protocols can be stored in the devices attached to the nodes or a control node can be used.

1 Claim, 8 Drawing Sheets

APPARATUS FOR AND METHOD OF COMMUNICATING AMONG DEVICES INTERCONNECTED ON A BUS

RELATED APPLICATIONS

This invention claims priority to provisional application Ser. No. 60/038,951, filed Mar. 7, 1997.

BACKGROUND OF THE INVENTION

2. Field of the Invention

The invention relates to systems and methods for communicating data among a plurality of devices interconnected on a bus. In particular, the invention relates to allocating system resources to accomplish efficient data communications.

2. Related Art

Figure 1:
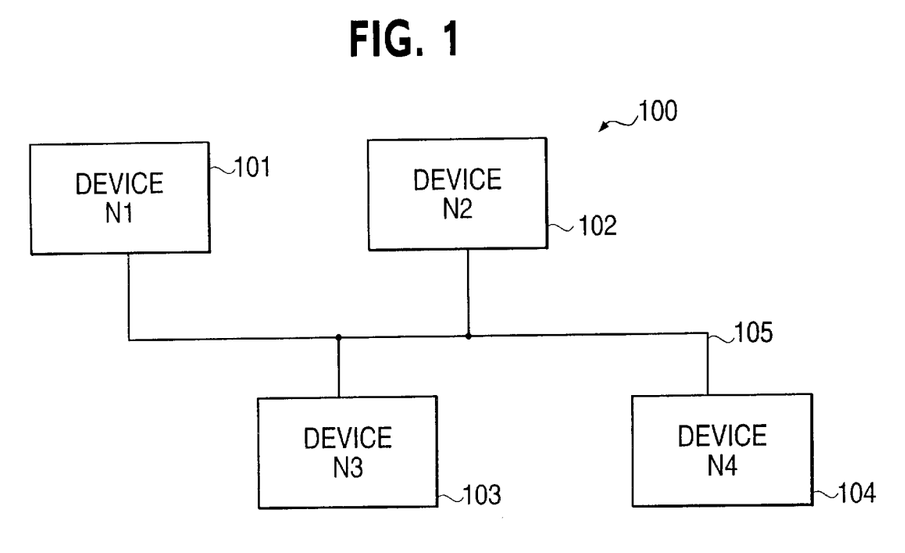
FIG. 1 is a block diagram illustrating a conventional data communication system.

Conventional data communication systems such as that shown generally at 100 in FIG. 1, typically include a plurality of information processing devices 101–104 which communicate by exchanging messages over an information transfer medium or bus 105. Since only one communication can take place at a time, each device must compete for access to the bus when it has information to transmit to another device. Thus, when device 101 seeks to transmit a message to device 104, device 101 must first determine that bus 105 is not occupied by a data transmission between any other devices.

Numerous schemes have been used to arbitrate access to an information transfer medium, such as information transmission bus 105. For example, access to the bus can be granted by passing a token or by collision detection arbitration. In token arbitration, each device is allocated a time period during which it can access the information transmission medium. In those token passing systems which allow a device to hold the token until it transmits its complete message, devices holding a token for a long period of time can cause significant slowing of more urgent communications. In those systems in which a device may only hold a token for a limited period of time, it is possible that the device will not complete transmission of its message before it is required to release the token and bus access. Collision detection systems monitor information transfers on the bus by monitoring energy or voltage levels. When an energy level exceeds a threshold, the devices recognizes that two or more messages are on the bus at the same time. As a result, each information processing device 101–104 ceases transmission of its message and an arbitration scheme is executed to allow one device to access the bus first and another device to access the bus at a later time. A significant disadvantage of collision detection systems results from the time required to detect the collision and arbitrate access, thereby resulting in system latency.

SUMMARY OF THE INVENTION

In view of the above identified limitations of the related art, it is an object of the invention to provide efficient communication among devices communicatively linked via an information transfer medium or bus by providing access to the information transfer bus to each device without tying up the information transfer bus with access arbitration tasks.

The above and other objects of the invention are accomplished using a separate signalling channel used to exchange communication protocols and resource allocation for particular relationships between communicating devices. Thus, an information communication system according to the invention includes an information transmission bus and a signalling channel. A plurality of nodes is communicatively linked by the information transmission bus and the signalling channel. Predetermined valid communications among selected ones of the nodes are set up by the nodes in accordance with preselected transmission characteristics compatible among the nodes. The nodes set up the preselected transmission characteristics in response to a signal transmitted from one of the selected nodes on the signalling channel. The preselected transmission characteristics can include carrier frequencies on the information transmission bus, modulation characteristics, bandwidth allocation, allocations of other resources or any combination thereof. According to the invention, the protocol information can be transmitted from a source to a destination node over the signalling channel at the time the need for the transmission is determined. Alternatively, in another embodiment, the communication protocols can be pre-defined and stored in an active list for each node at net initialization. In still another embodiment, at net initialization, each device can broadcast its identifier and its protocol to the other devices, which store the protocol information. In these last two embodiments, it is only necessary for the destination device to read an identification code of the source device and then retrieve the information from a memory storing the protocol information. According to the invention, the protocol information can be stored in each of the nodes and the process executed as a distributed process or a control node can store the protocols. In the latter case, a first node, having a need to communicate with a second node, signals the control node. The control node then signals the destination node either with the identification of the source node so that the destination node can retrieve the protocols stored therein or, alternatively, the control node can transmit the protocol to the destination node. One advantage of a control node is that the control node, in response to monitoring traffic, can change the protocols and transmit new protocols to source and destination nodes via the signalling channel, as needed to accommodate information traffic on the information transfer medium. In system according to the invention the control node can also be used to monitor patterns of information transfer traffic and reallocate resources accordingly. Further, a system according to the invention provides for nodes to negotiate an acceptable communication protocol.

BRIEF DESCRIPTION OF THE DRAWINGS

The above and other objects are accomplished by the invention as described herein with reference to the drawings in which.

DETAILED DESCRIPTION OF THE PREFERRED EMBODIMENTS

Figure 2:
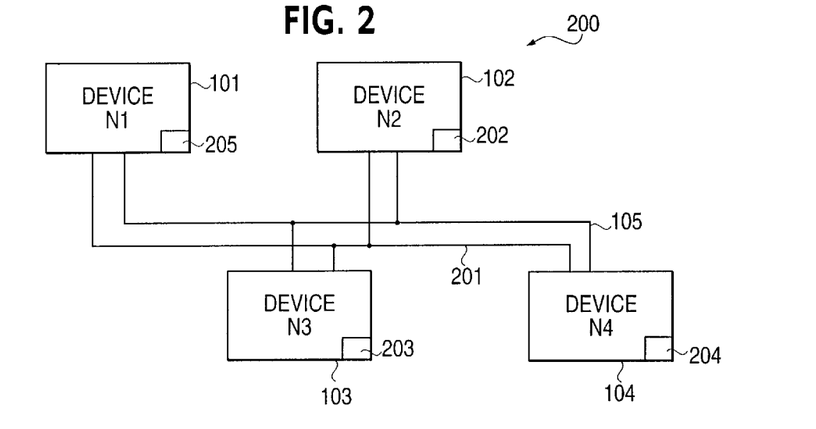
FIG. 2 is a block diagram illustrating a data communication system incorporating a signalling channel according to the invention.

FIG. 2 shows a system 200 according to the invention in which information communication devices, such as processors 101–104 are communicatively linked via an information transmission bus 105. Also shown in FIG. 2 is a signalling channel 201 over which signal information concerning protocols for transmitting information among devices 101–104 over information transmission bus 105 can be routed to devices 101–104. Signalling channel 201 can also transmit resource allocations, such as carrier frequencies, modulation types, and bandwidth allocations, to be used by devices 101–104 in their communications with each other.

One feature according to the invention, is that specific resource allocations can be made for specific data transfers between devices. For example, information can be transmitted on signalling channel 201 which causes communications between device 101 and 103 to take place in accordance with one set of parameters and communications between device 101 and 102 to take place in accordance with another set of parameters over information transmission bus 105 For instance, communications between device 101 and 103 may take place at a specific carrier frequency $F_1$ within a narrow band from ($F_1-F_n$ to $F_1+F_n$) with digital information encoded using 32 level phase shift keying. In contrast, information may be transferred from device 101 to device 102 over information transmission bus 105 at a different carrier frequency $F_2$ in a wide band extending from ($F_{sub2}-F_w$ to $F_2+F_w$) using binary information that is not otherwise coded.

Thus, one feature according to the invention, is that a first device may communicate with a second device using a first protocol and a first allocation of information transmission bus resources, while communicating with a third device using a different protocol and a different allocation of information transmission bus 105 resources. This feature of the invention is useful where, for example, device 101 is a processor, device 103, which operates in a narrow band, is a modem and device 102, which operates in a wide band is a video device.

Further, according to the invention, the allocation of information resources may allow multiple devices to communicate over the bus at the same time. For example, where device 101 and device 103 are communicating on a first carrier, device 104 and device 102 can be communicating on a second carrier frequency simultaneously.

In FIG. 2, signalling channel 201 can be a frequency band dedicated as a signalling channel on the information transmission medium 105. In another configuration, according to the invention, signalling channel 201 can be a physically separate medium. In this case, each of the individual devices 101–104 is physically connected to both the information transmission bus 105 and the separate signalling channel 201. Signalling channel 201 will typically be of a lower bandwidth than the information transmission bus 105, since the signalling channel need not carry the information content to be transferred among the devices 101–104. An arrangement in which the signalling channel is a physically separate entity makes available additional bandwidth on the information transmission bus 105, thereby extending its information transfer capabilities. The information transmission bus 105 can be a wired bus, a wireless bus, a fiber optic bus or any other suitable transmission medium. If the signalling channel is a dedicated frequency band of the information transfer bus 105, the medium should be selected to accommodate both the signalling channel and the information transfer messaging needs. Whether the signalling channel is a physically separate bus, the signalling channel can also be a wired, wireless, fiber optic or other medium.

Figure 3:
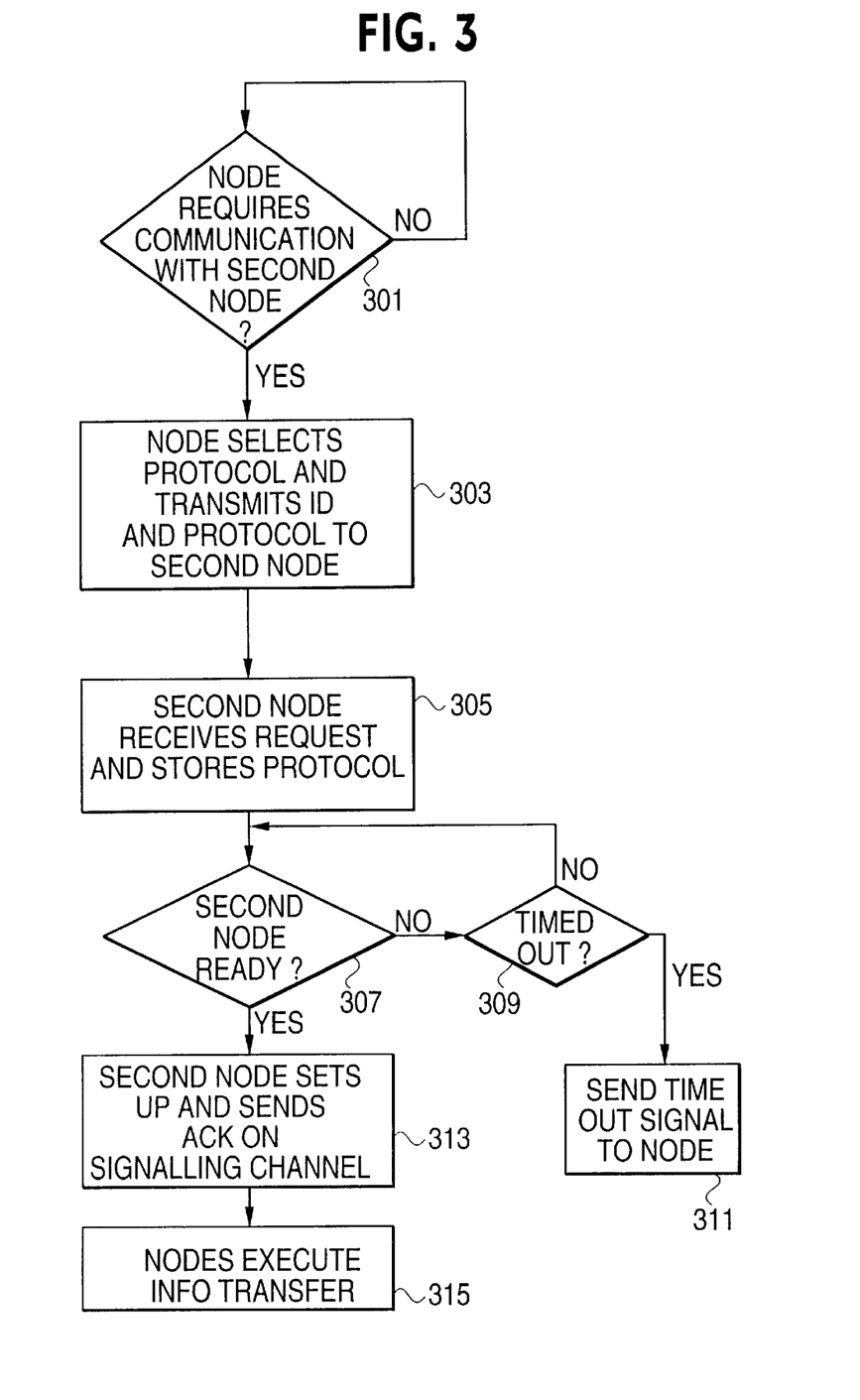
FIG. 3 is a flow diagram illustrating processing according to one embodiment of the invention.

FIG. 3 illustrates communication of information in one embodiment according to the invention. In step 301, a device, such as a device at node 101, determines if it requires communication with a device at a second node, such as node 103. In step 303, the device at node 101 selects a protocol and transmits its identification code and the protocol selected to the second node, in this case node 103. The protocol and identification number are transmitted from the device at source node 101 to the device at node 103 via the signalling channel 201. In step 305, the device at the second or destination node 103 receives the request and stores the protocol, for example in a memory 203. In step 307, the device at the destination node determines if it is ready to receive the message on the information transmission bus 105 or if it cannot receive the message because resources are not available or the device attached to the node is busy with another task or other communication. If the device is not ready, a timer can be triggered, as shown in step 309. If the timer times out before the device destination node 103 is ready, the device destination node can send a signal via the signalling channel 201 to the source node 101 generating the message, as shown in step 311, to indicate that a second signal is required to activate the destination node. Alternatively, steps 309 and 311 can be omitted and, when ready, the device at the destination node can set up and send an acknowledge signal on the signalling channel 201, as shown at step 313. Of course, if the device at the destination node is ready immediately, step 313 would be executed regardless of whether or not the time out feature was implemented. Once the acknowledge signal is transmitted over signalling channel 201 from the destination node to the source node, the nodes can execute the information transfer, as shown at step 315.

Figure 4:
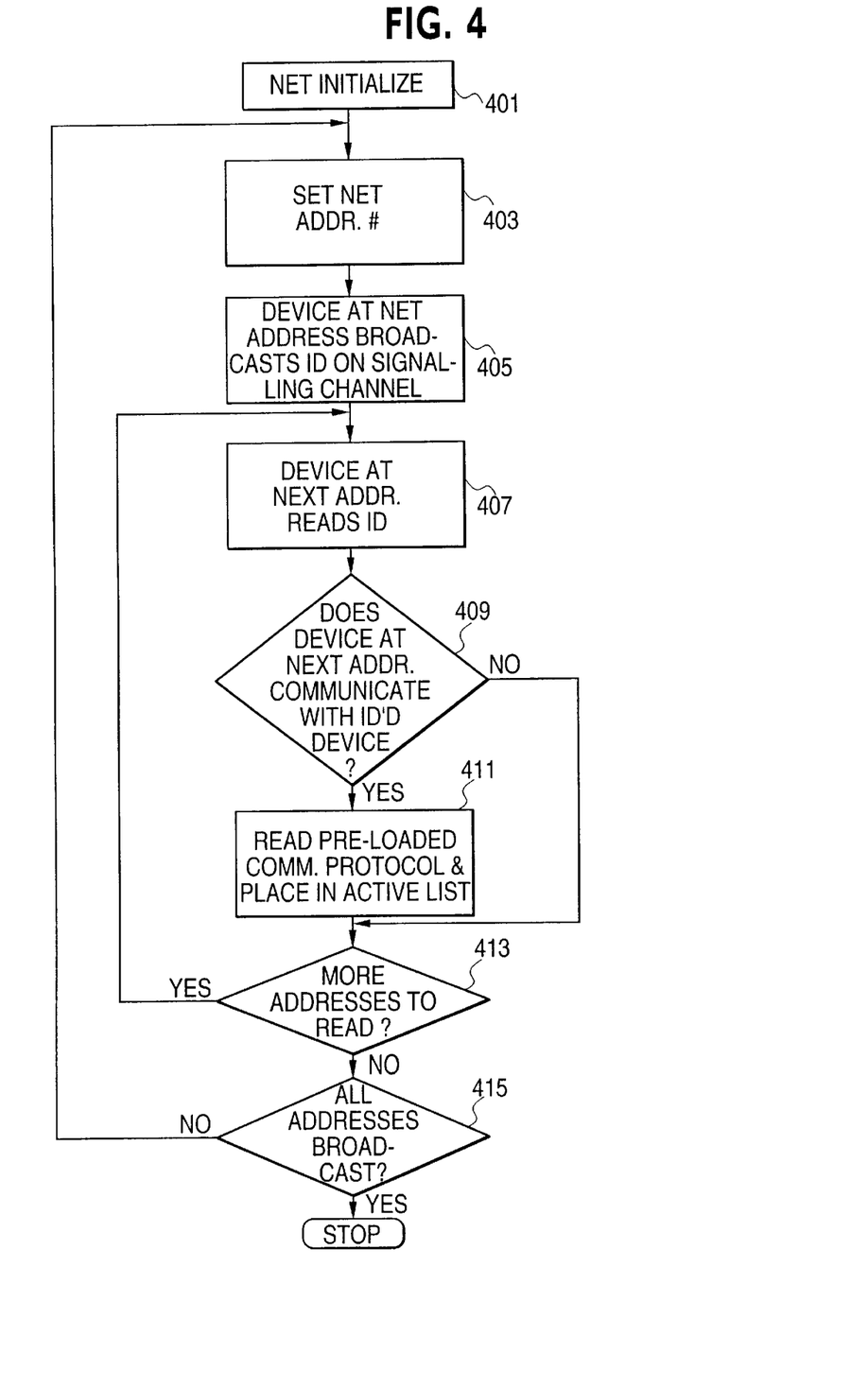
FIG. 4 is a flow diagram illustrating an embodiment of the invention in which the nodes are initialized with predetermined communication protocol.

FIG. 4 illustrates another configuration according to the invention in which the devices at nodes are initialized with data transmission protocols and resource allocations, in particular allocations of resources on information transmission medium 105. Step 401, identified as a net initialize step, takes place when a network is brought up, when a new node is added to a network, or when a new device is added to an existing node of a network. For example, a network may have fifty nodes with only thirty active devices. However, when a new device is added to an existing node, it is necessary to establish communication paths between the new device and the other devices connected to the various nodes of the network. Similarly, when a new node is added to a network, thereby increasing the capabilities of the network, attachment of a device to that new node requires that communication paths be established between the device at the new node and the remaining nodes on the network.

According to this aspect of the invention, at step 403, the net address or node number for a device is set and at step 405, the device at that net address broadcasts its identifier on the signalling channel. In step 407, the device at the next address reads the device identifier broadcast on signalling channel 201. In step 409, this device then tests whether it communicates with the broadcasting device, as shown in step 409. If so, in step 411, the device at the node receiving the broadcast reads a corresponding communication protocol previously loaded into its memory and places that device and protocol into an active list. In step 413, if all the devices at the network addresses have not yet read the broadcast identification number, control returns to step 407. If there are no more addresses to read the broadcasts, step 415 determines whether there are any remaining addresses to broadcast device identifiers. If so, control is returned to step 403 and the next network address is selected.

Figure 5:
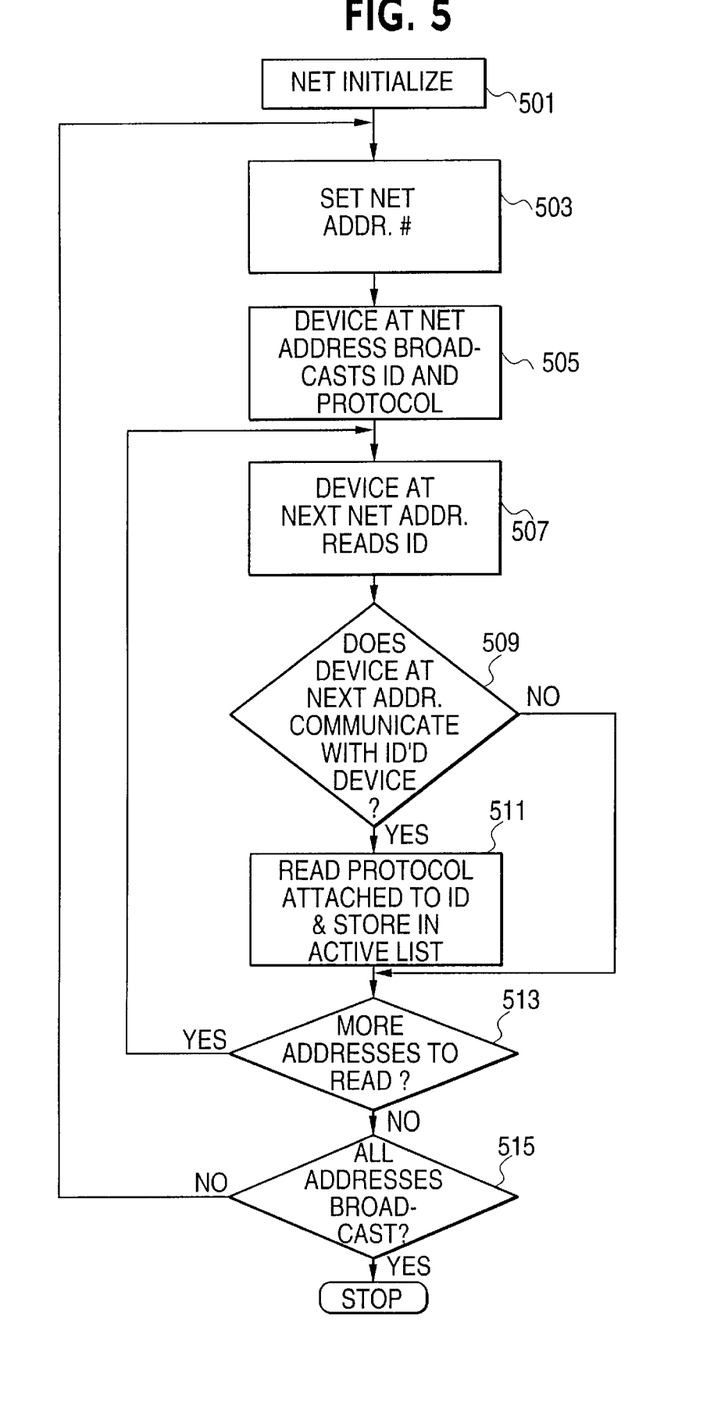
FIG. 5 is a flow diagram illustrating an embodiment according to the invention in which initialization includes broadcasting and reading of information protocols at initialization.

FIG. 5 illustrates a variation on the method disclosed in FIG. 4. Steps 501 and 503 correspond generally to steps 401 and 403 in FIG. 4. In step 505, the device at the net address broadcasts not only its identifier, but also the protocol it prefers to use for communication. In step 507, the device at the next network address reads the identification and at step 509 determines whether it will communicate with the device identified in the broadcast. If so, in step 511 the device reads the protocol attached to the broadcast identification and stores the device identifier and the protocol in an active list in its memory. Steps 513 and 515 correspond generally to step 413 and 415 previously discussed.

Figure 6:
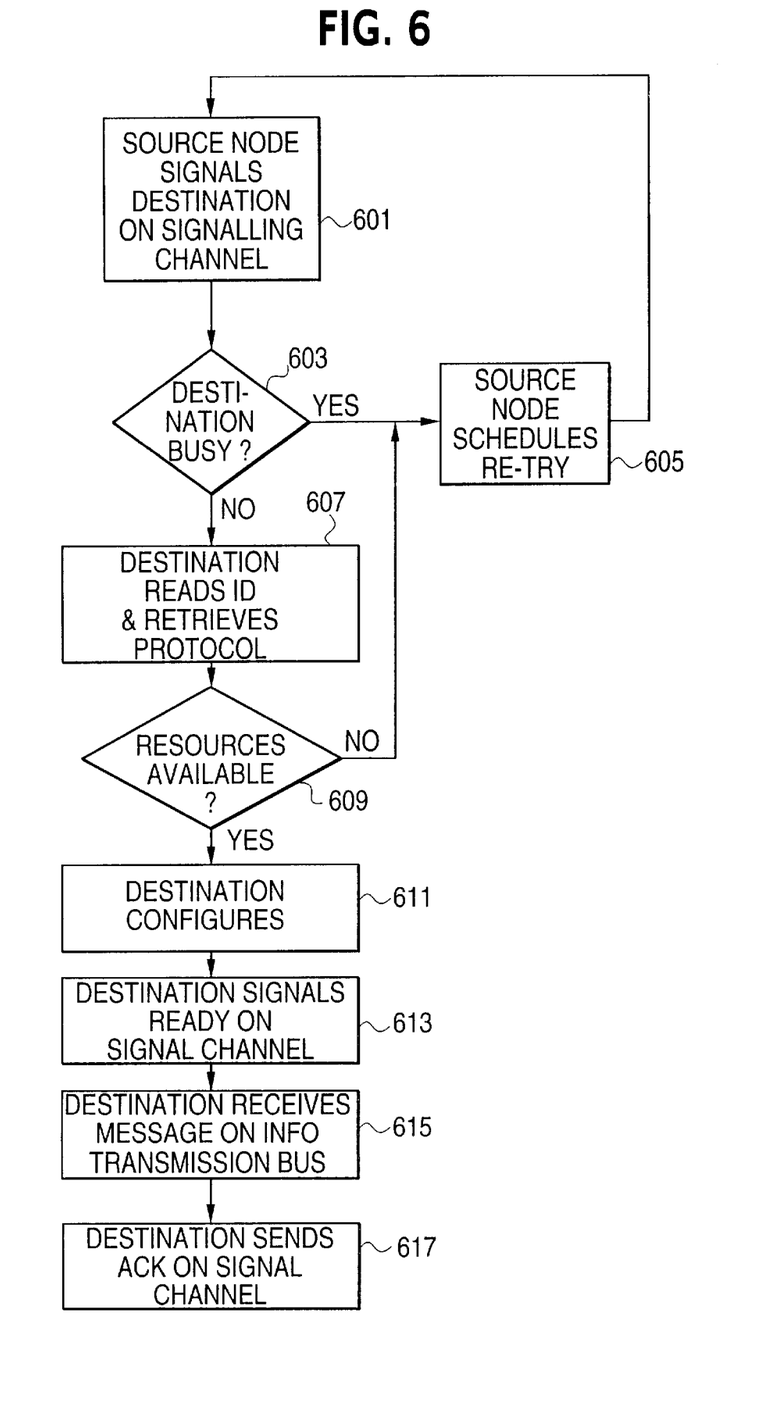
FIG. 6 illustrates a flow diagram of system operation after net initialization, as shown in FIGS. 4 and 5.

FIG. 6 is a flow diagram illustrating communications which take place when the system is configured as shown in either FIGS. 4 or 5. In step 601, a source node wishing to transmit a message on information transfer bus 105 signals a destination node by sending a message on signalling channel 201. In step 603, if the device of the destination node is busy, the device at the destination node sends a busy signal on signalling channel 201 to the device at the source node. In step 605 the source node schedules another attempt to transmit the information and control returns to step 601. Assuming that in step 603 the destination node is not busy, in step 607 the destination node reads the identification number of the device attached to the signalling node and retrieves the protocol from its memory. Since the device at the destination node may include a processor using resources that might be needed to execute the communication, step 609 determines whether the resources are available at the destination node. Such resources can include buffer memory space and processing resources to recognize the message and send an acknowledge signal back to the source node. If in step 609 the device at destination node determines it does not have the resources available to handle the communication request, it sends a signal on the signalling channel 201 to the device at the source node which then executes step 605 to schedule another attempt.

Where in step 609 the destination node determines that resources are available to execute the communication request, in step 611 the device at destination node configures itself to the protocol and resource allocations retrieved from memory. For example, the protocol may require the destination node to receive wide band communications on a carrier centered at frequency $F_2$. In this case, in step 611, the destination node will configure a bandpass filter having the appropriate parameters to interface with information transmission bus 105. This configuration can take place in hardware or software and typically is a programmable feature set up in accordance with a predetermined program. It should be noted that the time required for a device to configure itself may introduce some delay in the transmission. Thus, a device at a node sourcing a message should transmit the signalling information as early as possible. In any case, in step 613, when the destination is configured, it win transmit a signal on signalling channel 201 to the source device. In step 615, the destination receives the message on the information transmission bus 105. Upon completion of the information transfer, in step 617, the device at the destination node transmits and acknowledge receipt signal on signalling channel 201 to the source device.

Figure 7:
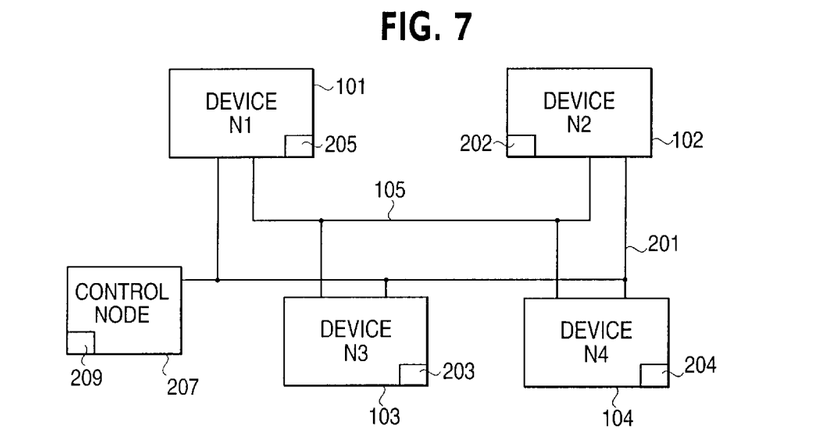
FIG. 7 is a block diagram illustrating a system according to the invention with the control node.

FIG. 7 illustrates another system configuration according to the invention which incorporates control node 207. In this configuration, control node 207 can be used to perform the functions previously described herein performed by the individual nodes themselves. Thus, control node 207 can store in a control memory 209 the preselected transmission protocols and resource allocations for communications between pairs of devices. In set-up operation, control node 207 would poll each node to determine what type of device is attached to the node and, based on this information, store the appropriate communication protocol in an active list. In communications operation, when device 101 wishes to communicate with device 103 the control node detects the signal on the signalling channel 201 and sends commands on signalling channel 201 to devices 101 and 103 to set up the appropriate communication protocol.

Figure 8:
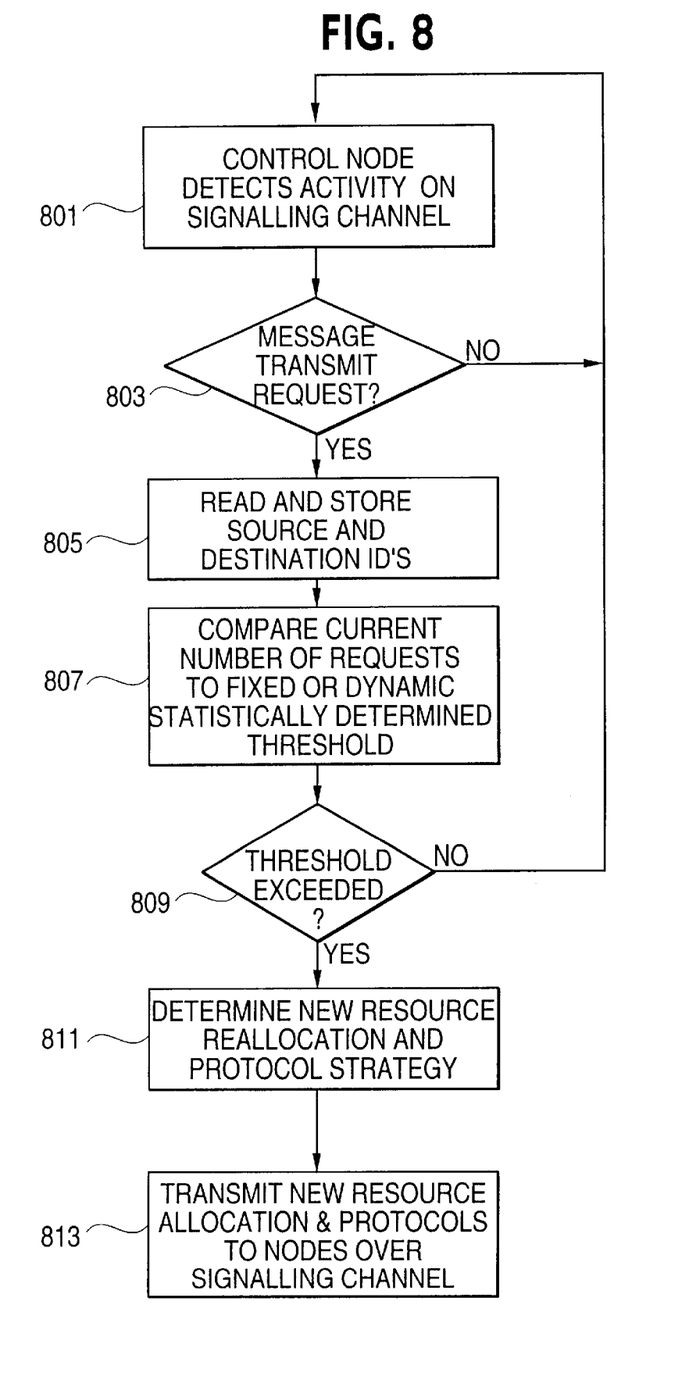
FIG. 8 is a flow diagram illustrating an information traffic monitoring embodiment.

FIG. 8 illustrated a flow diagram of a system in which the control node 207 monitors information traffic so that the system can adapt itself to changing traffic loads. Information traffic is monitored based on requests for communication between nodes on signalling channel 201. As shown in step 801, when the control node detects activity on the signalling channel the control node determines if the activity consists of a message transmission request as shown in step 803. If the information being transmitted on the signalling channel 201 is not a request to transmit information between devices connected to nodes, the control node continues to detect activity on the signalling channel, as shown in step 801. On the other hand, if the control node detects a message transmission request, in step 805 the control node reads and stores the source and destination identifiers of the devices involved in the communication request. In step 807 the control node evaluates the number of communication requests between devices attached to the various nodes. In one embodiment of step 807, control node 207 is programmed to count the number of requests and compare the count to a fixed threshold. For example, control node 207 may count fifty requests for the device at node 101 to communicate with the device at node 103. If the devices at node 101 and 103 communicate using relatively short messages, the resource allocation or communication protocol between these devices may not need to be altered at such a level of information transfer requests. However, if the device at node 101 and the device at node 103 communicate using long messages, fifty requests in a specific period may be excessive for the resources allocated. Thus, a count of the number of requests in a predetermined period can be compared against a fixed threshold to determine if resource allocations should be changed. The fixed threshold can be previously loaded into control node 207.

Another alternative would be to allow the counter to count up each time a particular message request is transmitted over the signalling channel and to count down one count for each predetermined time period in which no request for communication between the same nodes is made. This provides a rolling count and is useful for detecting communication bursts which may require temporary reallocation of communication resources.

An alternative to using fixed thresholds in step 807 is to allow the control node 207 to maintain communication statistics concerning the relative number of requests for communication between pairs of devices, the length of the data transmission required, and other relevant parameters. Using these statistics, a processor in the control node 207 can determine if more bandwidth should be allocated for communications between particular pairs of nodes, or if carrier frequencies should be altered.

Using either a fixed threshold or a dynamic statistically determined threshold, in step 809 the control node 207 determines whether the current message transmission request exceeds the threshold. If not, control returns to step 801 and the node continues to monitor activity on the signalling channel. If the threshold is exceeded, control node 207 then acts to reallocate resources and to define new protocols for device communications, as shown at step 811. In one embodiment for implementing step 811, the control processor can access alternative resource allocations and protocols previously loaded into the control nodes' memory. Using this approach, the control node executes an orderly sequence of alternative resource allocations and protocol strategies. In another embodiment according to the invention, the control node 207 can dynamically determine resource allocations in accordance with system communications statistics. The dynamic reallocation can be performed using any desired approach and would typically be arrived at by executing a program.

Upon completion of determining the resource allocation and protocol strategy, in step 813 the control node transmits the new resource allocations and protocols to the devices connected to the various nodes over the signalling channel 201. In one embodiment according to the invention, each of the control nodes stores the resource allocations and protocols appropriate for communicating with each of the other nodes. In this case, the control node 207 can broadcast all the information together over the signalling channel 201. In another alternative embodiment according to the invention, the control node transmits the new resource allocation information only in response to specific requests for communication. Thus, the control node would store the protocol and resource allocations for all the communication possibilities in the network and transmit the new protocol and resource allocations to particular devices only when those particular devices seek to communicate with each other.

Figure 9:
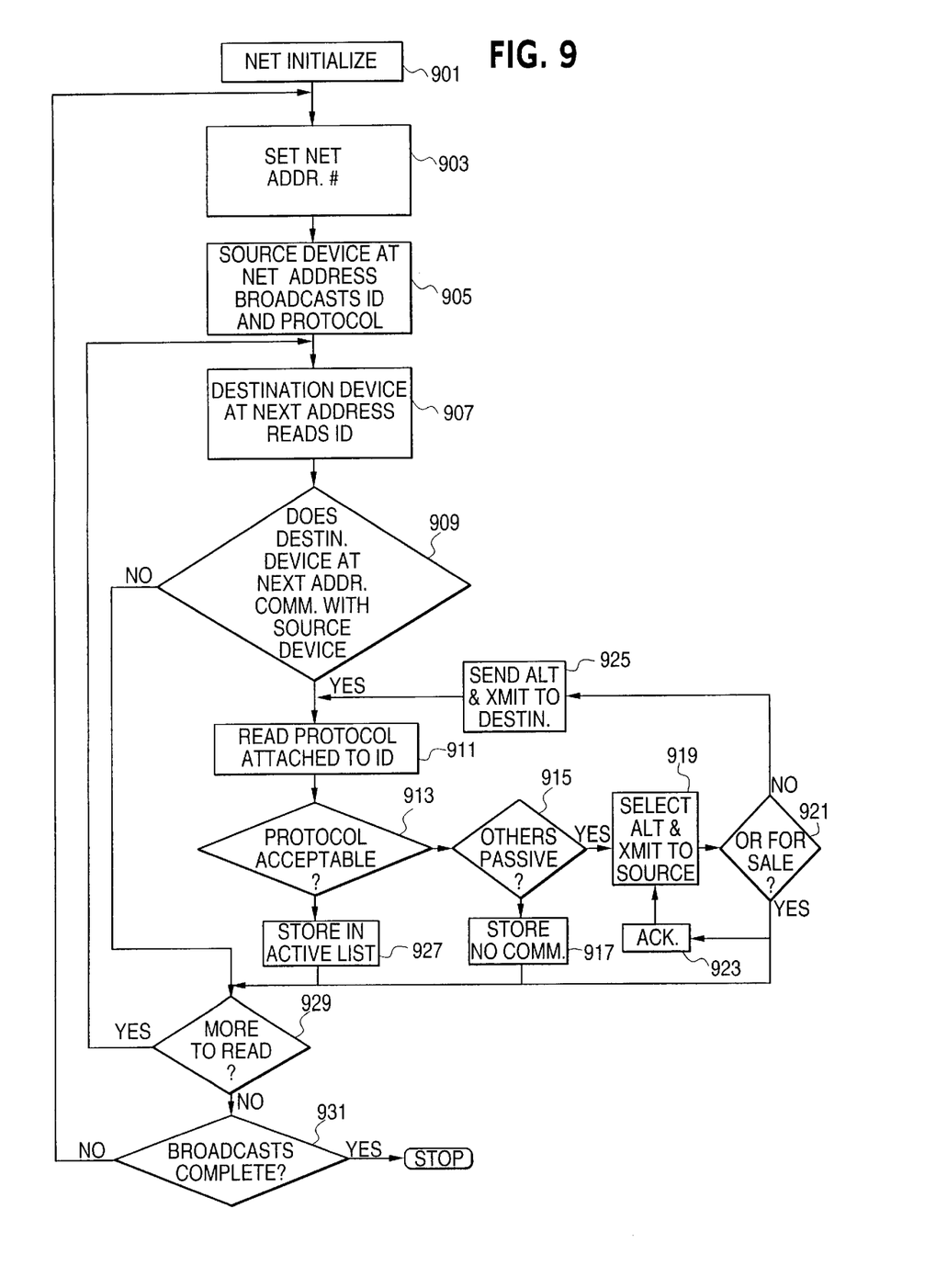
FIG. 9 is a flow diagram illustrating a system in which devices attached to nodes of a network negotiate protocols and resource allocation.

FIG. 9 is flow diagram illustrating still another approach to establishing communication protocols and resource allocations according to the invention. Steps 901, 903, 905, 907 and 911 correspond generally to steps 501, 503, 505, 507, 509 and 511, respectively, as previously described. As a result, at the completion of step 911, a destination device has received a broadcast identifier and protocol from a device attached to another node. In step 913, the destination device determines whether the protocol is acceptable to it. For example, the protocol may require that the destination device have a buffer memory that is not available in the destination device. If a protocol is not acceptable to the destination device, the destination device in step 915 will then determine if there are other communication options available for communicating with the source device broadcasting its identification. If not, in step 917 the destination device stores a flag indicating it cannot communicate with the source device broadcasting its identification.

Where the destination device determines in step 915 that other communication options do exist, in step 917 the destination device selects an alternative and transmit that alternative to the source device broadcasting its identification code. The source device then determines if it can communicate using the alternative selected by the destination device, as shown in step 921. If so, in step 923 the source device sends an acknowledge signal to the destination device and the parameters for communicating between the two devices are established and recorded, either in the devices themselves or in a control node 207.

If the alternative selected by the destination node in step 919 is determined in step 921 not to meet the requirements of the source node broadcasting its identifier, in step 925 the source node selects another alternate and transmit that information to the destination node and control is returned to step 911, where the process repeats. It should be noted that all communication between the source and the destination node in this process of negotiating a communication protocol takes place over signalling channel 201. Assuming that a protocol is eventually determined that is acceptable to the devices attached to both the source and destination nodes, the protocol is stored in an active list in step 927, either in the node themselves or in a control node 207. Steps 929 and 931 which correspond in general, respectively, to steps 513 and 515 previously described can then be executed.

Another aspect another to the invention concerns the transmission of information on the signalling channel. Optionally, for convenience, information on the signalling channel can be transmitted in a common format. For example, such a common format would include the identity of each of the nodes involved in the communication and the protocol to be used. Where protocols are already stored in active lists in devices attached to the nodes, it is only necessary to identify the number of the protocol, which can then be retrieved from the active list. For example, communications between devices attached to node 101 and 103 may be referenced by a message identifying nodes 101 and 103, and communication protocol number 42. Each node would then retrieve protocol number 42 from its active list of protocols and configure itself accordingly.

While specific embodiments of the invention have been described and illustrated, it will be clear that variations in the details of the embodiments specifically illustrated and described may be made without departing from the true spirit and scope of the invention as defined in the appended claims.

What is claimed is:

1. An information communication system comprising:

an information transmission bus;

a signalling channel; and a plurality of nodes communicatively linked by said information transmission bus and said signalling channel, communication among selected ones of said nodes being set up by said nodes in accordance with transmission characteristics negotiated by said nodes over said signalling channel, said transmission characteristics, including communication protocols, being stored after said negotiation and retrieved to configure said nodes to transmit and receive messages over said information transmission bus, a first of said nodes communicating with a second of said nodes using a first communication protocol, and said first of said nodes communicating with a third of said nodes using a second communication protocol different from the first communication protocol.

* * * * *